United States Patent
Yang et al.

(10) Patent No.: US 9,606,267 B2
(45) Date of Patent: *Mar. 28, 2017

(54) ANTI-REFLECTIVE FILM, COMPRISING HARD COATING LAYER, HAVING SUPERB OPTICAL CHARACTERISTICS

(71) Applicant: LG Hausys, Ltd., Seoul (KR)

(72) Inventors: Ji-Yeon Yang, Seoul (KR); Hong-Kwan Cho, Anyang-si (KR); Jin-Ki Hong, Seoul (KR); Won-Kook Kim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/443,645

(22) PCT Filed: Oct. 14, 2013

(86) PCT No.: PCT/KR2013/009123
§ 371 (c)(1),
(2) Date: May 18, 2015

(87) PCT Pub. No.: WO2014/081119
PCT Pub. Date: May 30, 2014

(65) Prior Publication Data
US 2015/0301231 A1    Oct. 22, 2015

(30) Foreign Application Priority Data
Nov. 21, 2012  (KR) .................. 10-2012-0132542

(51) Int. Cl.
G02B 1/111    (2015.01)
B32B 27/08    (2006.01)
G02B 1/10     (2015.01)

(52) U.S. Cl.
CPC .............. *G02B 1/111* (2013.01); *B32B 27/08* (2013.01); *G02B 1/105* (2013.01);
(Continued)

(58) Field of Classification Search
CPC ....... B32B 27/08; B32B 27/20; B32B 27/283; B32B 2264/102; B32B 2307/418; Y10T 428/249999
See application file for complete search history.

(56) References Cited

U.S. PATENT DOCUMENTS 5,880,227 A * 3/1999 Kobayashi ........... C09D 183/04
                                                     525/102
6,572,973 B1 * 6/2003 Taruishi .................. B32B 27/08
                                                     428/428
(Continued)

FOREIGN PATENT DOCUMENTS

CN    1412577 A    4/2003
CN    1821813 A    8/2006
(Continued)

OTHER PUBLICATIONS

International Search Report for PCT/KR2013/009123 mailed on Jan. 6, 2014.
(Continued)

*Primary Examiner* — Hai Vo
(74) *Attorney, Agent, or Firm* — Hauptman Ham, LLP (57) ABSTRACT

Provided is an anti-reflective film having a stacked structure comprising a transparent substrate, a hard coating layer, a high refraction layer and a low refraction layer, and more specifically, the low refraction layer may comprise, as a binder, a siloxane compound synthesized by reacting alkoxysilane and organosilane having a fluoroalkyl group.

11 Claims, 3 Drawing Sheets

(52) U.S. Cl.
CPC ... *B32B 2264/102* (2013.01); *B32B 2307/412* (2013.01); *B32B 2383/00* (2013.01)

(56) References Cited

U.S. PATENT DOCUMENTS

| | | | |
|---|---|---|---|
| 2006/0188664 A1* | 8/2006 | Ando | C09D 7/1266 |
| | | | 428/1.1 |
| 2007/0146887 A1* | 6/2007 | Ikeda | G02B 1/111 |
| | | | 359/586 |
| 2007/0266896 A1* | 11/2007 | Suwa | C09D 5/006 |
| | | | 106/287.16 |
| 2015/0274983 A1* | 10/2015 | Cho | C09D 183/02 |
| | | | 428/550 |
| 2015/0323706 A1* | 11/2015 | Yang | G02B 1/11 |
| | | | 359/581 |

FOREIGN PATENT DOCUMENTS

| | | | |
|---|---|---|---|
| JP | 2002317152 A | 10/2002 | |
| JP | 2003057415 A | 2/2003 | |
| JP | 2006106715 A | 4/2006 | |
| KR | 1020050065345 A | 6/2005 | |
| KR | 20090060265 A | 6/2009 | |
| KR | 20090119968 A | 11/2009 | |

OTHER PUBLICATIONS

Chinese Office Action issued on Dec. 16, 2015 corresponding to Chinese Application No. 201380060944.1.

* cited by examiner

ANTI-REFLECTIVE FILM, COMPRISING HARD COATING LAYER, HAVING SUPERB OPTICAL CHARACTERISTICS

CROSS REFERENCE TO RELATED APPLICATION

This application claims the priority of Korean Patent Application No. 10-2012-0132542, filed on Nov. 21, 2012 in the KIPO (Korean Intellectual Property Office). Further, this application is the National Phase Application of International Application No. PCT/KR2013/009123 filed Oct. 14, 2013, which designates the United States and was published in Korean. Both of the priority documents are hereby incorporated by reference in their entireties.

TECHNICAL FIELD

The present invention relates to an anti-reflective film including a hard coating layer having excellent optical properties.

BACKGROUND ART

When a display is exposed to external light such as various illumination and natural light, an image formed inside the display is not clearly focused on an eye, thereby causing deterioration in contrast of the display. Due to such deterioration in contrast, a person has difficulty in viewing a screen and suffers from eye fatigue or a headache. For this reason, there is a strong demand for anti-reflection.

As the need for anti-reflection has been emphasized, in an effort to find a film structure capable of providing anti-reflection in the visible range, an anti-reflective film including a high refractive-index layer and a low refractive-index layer repeatedly stacked one above another has been developed, and continuous studies have been made to reduce the number of layers. Moreover, although such an anti-reflective film has been developed in the form of a laminate structure in which a low refractive-index layer is formed on a high refractive-index layer, it is still challenging to design an anti-reflective film including a low refractive-index layer and a high refractive-index layer.

DISCLOSURE

Technical Problem

It is an aspect of the present invention to provide an anti-reflective film which provides excellent anti-reflection using a hard coating layer, a high refractive-index layer and a low refractive-index layer while exhibiting improved strength and optical properties.

Technical Solution

In accordance with one aspect of the present invention, an anti-reflective film has a laminate structure of a transparent substrate, a hard coating layer, a high refractive-index layer, and a low refractive-index layer, wherein the low refractive-index layer includes: a binder prepared by polymerization of a silane compound represented by Formula 1 with an organosilane compound represented by Formula 2; and hollow silica particles.

$$R^1_x Si(OR^2)_{4-x} \quad \text{[Formula 1]}$$

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x < 4$.

$$R^3_y Si(OR^4)_{4-y} \quad \text{[Formula 2]}$$

where $R^3$ is a $C_1$ to $C_{12}$ fluoroalkyl group; $R^4$ is a $C_1$ to $C_6$ alkyl group; and y is an integer satisfying $0 \leq x < 4$.

The silane compound represented by Formula 1 may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof.

The organosilane compound represented by Formula 2 may include at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof.

The hollow silica particles may have a number average diameter of about 1 nm to about 1,000 nm.

The binder may be present in an amount of about 10 parts by weight to about 120 parts by weight based on 100 parts by weight of the hollow silica particles.

The hard coating layer may have an index of refraction of about 1.5 to about 1.6.

The hard coating layer may have a thickness of about 50 nm to about 200 nm.

The hard coating layer may include inorganic nanoparticles, an UV-curable resin, a curing initiator, and a solvent.

The low refractive-index layer may have an index of refraction of about 1.2 to about 1.25.

The high refractive-index layer may have an index of refraction of about 1.6 to about 1.7.

The anti-reflective film may have a pencil hardness of about B to about H.

The anti-reflective film may have a water contact angle of about 70° or less.

The anti-reflective film may have a reflectance of less than about 0.5% as measured at a wavelength of about 380 nm to about 780 nm.

The anti-reflective film may have a color value a* of $-1 < a^* < 2$ and a color value b* of $-1 < b^* < 1$ for reflected light upon irradiation with white light.

Advantageous Effects

The anti-reflective film can exhibit excellent strength and improved optical properties.

In addition, the anti-reflective film can be applied to various displays, such as touch films, by virtue of excellent anti-reflection effects thereof.

BEST MODE

Hereinafter, embodiments of the present invention will be described in detail. However, it should be understood that the present invention is not limited to the following embodiments and should be defined only by the accompanying claims and equivalents thereof.

In accordance with one embodiment of the present invention, an anti-reflective film has a laminate structure of a transparent substrate, a hard coating layer, a high refractive-index layer, and a low refractive-index layer, wherein the low refractive-index layer includes: a binder prepared by polymerization of a silane compound represented by Formula 1 with an organosilane compound represented by Formula 2; and hollow silica particles.

$$R^1_x Si(OR^2)_{4-x}$$ [Formula 1]

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying 0≤x<4.

$$R^3_y Si(OR^4)_{4-y}$$ [Formula 2]

where $R^3$ is a $C_1$ to $C_{12}$ fluoroalkyl group; $R^4$ is a $C_1$ to $C_6$ alkyl group; and y is an integer satisfying 0≤x<4.

Generally, anti-reflection effects increase with increasing difference in index of refraction between the low refractive-index layer and the high refractive-index layer. Thus, continuous studies have been made to develop low refractive-index coating materials having a very low index of refraction through development of hollow silica particles. However, the index of refraction of low refractive-index coating materials prepared using typical acrylic resins dose not reach the range of about 1.22 to about 1.24, in which anti-reflection can be optimally realized in principle.

However, when a coating solution including, as a binder, a siloxane compound prepared by reacting a fluoroalkyl group-containing organosilane with alkoxysilane, is used for the low refractive-index layer, the anti-reflective film can realize high transmittance and low reflectance while exhibiting improved optical properties through optical design between the low refractive-index layer and the high refractive-index layer. Moreover, the anti-reflective film also includes the hard coating layer, thereby ensuring strength while realizing considerably reduced reflectance in a specific wavelength region.

The silane compound represented by Formula 1 may be a tetrafunctional alkoxy silane having four alkoxy groups when x is 0; a trifunctional alkoxy silane having three alkoxy groups when x is 1; and a bifunctional alkoxy silane having two alkoxy groups when x is 2. The silane compound represented by Formula 1 when x is 3 is not advantageous in condensation with the organosilane compound represented by Formula 2, since the silane compound has only one alkoxy functional group.

In Formula 1, the $C_6$ to $C_{10}$ aryl group may include a phenyl group, a tolyl group and the like, and the $C_3$ to $C_{10}$ alkenyl group may include an allyl group, a 1-propenyl group, a 1-butenyl group, a 2-butenyl group, a 3-butenyl group and the like.

The silane compound may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof, without being limited thereto.

The organosilane compound represented by Formula 2 may include at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof, without being limited thereto. In addition, it is advantageous that $R^3$ be a $C_3$ to $C_5$ fluoroalkyl group in terms of prevention of phase separation.

A siloxane compound is prepared by hydrolysis and dehydration condensation polymerization of the silane compound represented by Formula 1 and the organosilane compound represented by Formula 2. In hydrolysis and dehydration condensation polymerization, an acid catalyst may be used. Specifically, nitric acid, hydrochloric acid, sulfuric acid, acetic acid, or the like may be used.

In polymerization, the organosilane compound represented by Formula 2 is added in an amount of about 0.1 parts by weight to about 50 parts by weight, preferably about 1 part by weight to about 30 parts by weight, more preferably about 5 parts by weight to about 20 parts by weight, based on 100 parts by weight of the silane compound represented by Formula 1. If the amount of the organosilane compound is less than about 0.1 parts by weight, there are problems in that a formed coating layer provides insignificant reduction in index of refraction, whereas if the amount of the organosilane compound is greater than about 50 parts by weight, there are problems in that the coating layer can have an increased index of refraction.

The siloxane compound acts as an organic-inorganic hybrid binder and thus serves to treat surfaces of the hollow silica particles.

The siloxane compound has a weight average molecular weight of about 1,000 to about 100,000, preferably about 2,000 to about 50,000, more preferably about 5,000 to about 20,000. If the weight average molecular weight is less than about 1,000, it is difficult to form a coating layer having a desired low index of refraction, whereas if the weight average molecular weight is greater than about 100,000, there is a problem of deterioration in light transmittance of an anti-reflective film.

The hollow silica particles refer to silica particles which are derived from a silicon compound or an organic silicon compound and have an empty space on the surface thereof and/or therein.

The hollow silica particles may be dispersed in a dispersion medium (water or organic solvent) to form a colloid having a solid content of about 5% by weight (wt %) to about 40 wt %. Here, an organic solvent capable of being used as the dispersion medium may include: alcohols such as methanol, isopropyl alcohol (IPA), ethylene glycol, butanol, and the like; ketones such as methyl ethyl ketone, methyl isobutyl ketone (MIBK), and the like; aromatic hydrocarbons such as toluene, xylene, and the like; amides such as dimethyl formamide, dimethyl acetamide, N-methyl pyrrolidone, and the like; esters such as ethyl acetate, butyl acetate, γ-butyrolactone, and the like; ethers such as tetrahydrofuran, 1,4-dioxane, and the like; and mixtures thereof. However, when a colloid solution in which the hollow silica particles are dispersed in a dispersion medium is used, as described above, it is desirable that the amount of the hollow silica be adjusted within the range as set forth above in consideration of solid content and the like.

In addition, it is advantageous in maintenance of transparency of a film and in exhibition of anti-reflection thereof that the hollow silica particles have a number average diameter of about 1 nm to about 1,000 nm, specifically about 5 nm to about 500 nm, more specifically about 10 nm to about 100 nm.

The binder of the siloxane compound is present in an amount of about 10 parts by weight to about 120 parts by weight, preferably about 20 parts by weight to about 100 parts by weight, more preferably about 40 parts by weight to about 80 parts by weight, based on 100 parts by weight of the hollow silica particles. If the amount of the binder is less than about 10 parts by weight, there is a problem of whitening of a coating surface, and if the amount of the binder is greater than about 120 parts by weight, there is a problem of significant deterioration in anti-reflection of the coating layer.

The anti-reflective coating composition may include an acid catalyst to promote surface treatment of the hollow silica particles with the binder, and the acid catalyst may be any acid catalyst generally used in the art without limitation. Preferably, the acid catalyst is nitric acid or hydrochloric acid. The acid catalyst may be present in an amount of about 0.1 parts by weight to about 20 parts by weight based on 100 parts by weight of the hollow silica particles. In preparation of the anti-reflective coating composition, it is advantageous that the coating composition be adjusted to a pH of about 2 to about 4 using the acid catalyst.

Figure 1:
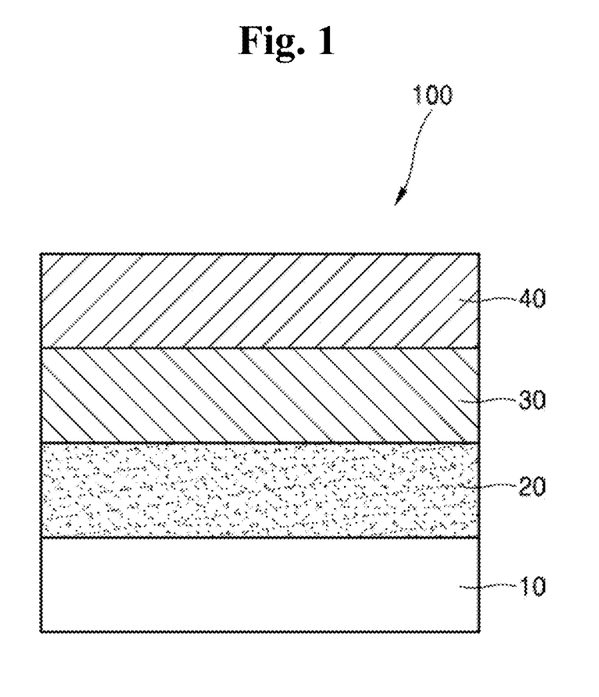
FIG. 1 is a schematic sectional view of an anti-reflective film according to one embodiment of the present invention.

Referring to FIG. 1, an anti-reflective film 100 may include a transparent substrate 10, a hard coating layer 20, a high refractive-index layer 30, and a low refractive-index layer 40.

The transparent substrate 10 may include various substrates, such as transparent polymer resins and the like, used for typical liquid crystal displays and the like. Specifically, the substrate may include polyethylene terephthalate (PET), polyethylene naphthalate (PEN), polyethersulfone (PES), polycarbonate (PC), polypropylene (PP), norbornene resins, and the like.

When a material of the substrate is PET, a PET film may have a thickness of about 10 μm to about 200 μm, specifically about 20 μm to about 100 μm. If the thickness of the transparent substrate is less than about 10 μm, the substrate has a problem in terms of mechanical strength, and if the thickness of the transparent substrate is greater than about 200 μm, there is a possibility that the substrate does not exhibit improved touch properties as a substrate for touch panels.

The anti-reflective film 100 may include the hard coating layer, in addition to the low refractive-index layer and the high refractive-index layer. The anti-reflective film can ensure strength and realize considerably reduced reflectance in a specific wavelength region by including the low refractive-index layer, the high refractive-index layer, and the hard coating layer at the same time.

The hard coating layer 20 may have a thickness of about 50 nm to about 200 nm. The hard coating layer may be formed on the transparent substrate and can ensure strength of the anti-reflective film relating to the high refractive-index layer and the low refractive-index layer. Thus, the anti-reflective film including the hard coat later can ensure optical properties in a relatively wide wavelength region as compared with an anti-reflective layer not including the hard coating layer, while exhibiting improved surface hardness. In addition, within the thickness range as set forth above, the hard coating layer can prevent haze.

The hard coating layer 20 may have an index of refraction of about 1.5 to about 1.6. The index of refraction of the hard coating layer may be lower than that of the high refractive-index layer and higher than that of the low refractive-index layer. The anti-reflective film can exhibit greatly improved optical properties by including the hard coating layer.

The hard coating layer 20 may include inorganic nanoparticles, a UV-curable resin, a curing initiator, and a solvent. As the inorganic nanoparticles, inorganic nanoparticles having been subjected to surface treatment with an acrylate compound may be used. Here, percentage of the treated surface area to overall surface area of the nanoparticle may range from 10% to 50%. Within this range, it is possible to realize a hard coating layer having uniform dispersibility and good transparency. The inorganic nanoparticles may include at least one selected form the group consisting of $SiO_2$, $Al_2O_3$, $CaCO_3$, $TiO_2$ and combinations thereof, without being limited thereto.

Examples of the UV-curable resin may include ethylene glycol diacrylate, neopentyl glycol di(meth)acrylate; 1,6-hexanediol di(meth)acrylate; trimethylolpropane tri(meth)acrylate; dipentaerythritol hexa(meth)acrylate; polyolpoly(meth)acrylate; di(meth)acrylate of bisphenol A-diglycidyl ether; polyester(meth)acrylate obtained by esterification of polyhydric alcohol, polyhydric carboxylic acid, anhydride thereof, and acrylic acid; polysiloxane-polyacrylate; urethane (meth)acrylate, pentaerythritol tetramethacrylate, and glycerin trimethacrylate, without being limited thereto.

Examples of the curing initiator may include thermo/photo polymerization initiators, such as benzene and benzene ether compounds, benzylketal compounds, α-hydroxyalkylphenone compounds, α,α-dialkoxyacetophenone derivative compounds, α-hydroxyalkylphenone compounds, α-aminoalkylphenone derivative compounds, α-hydroxyalkylphenone polymer compounds, acrylicphosphine oxide compounds, halogen compounds, phenylglyoxolate compounds, benzophenone derivative compounds, thioxanthone derivative compounds, 1,2-diketone compounds, water soluble aromatic ketone compounds, copolymer macromolecular compounds, amine compounds, titanocene compounds, acid anhydride and peroxide, and the like.

The solvent may be any solvent typically used in the art without limitation. Specific examples of the solvent may include: alcohols such as methanol, ethanol, propanol, isopropanol, and the like; ketones such as methyl isobutyl ketone, methylethylketone, and the like; esters such as methyl acetate, ethyl acetate, and the like; aromatic compounds such as toluene, xylene, benzene, and the like; ethers such as diethylether; and the like.

The high refractive-index layer 30 may have a thickness of about 100 nm to about 500 nm, specifically about 150 nm to 450 nm. Within this range, the high refractive-index layer can easily provide improved reflectance and visibility to the anti-reflective film, while minimizing cracking and curling due to increase in stress. Moreover, an anti-reflective film having optimized properties in terms of luminous reflectance relating to the low refractive-index layer can be provided.

The high refractive-index layer 30 may have an index of refraction of about 1.6 to 1.7. Within this range, it is possible to improve optical properties of the anti-reflective film in that the greater the difference in index of refraction between the high refractive-index layer and the low refractive-index layer, the higher the anti-reflection effect of the anti-reflective film.

The low refractive-index layer 40 may have a thickness of about 50 nm to about 150 nm. Within this range, the low refractive-index layer can provide improved anti-reflection to the anti-reflective film, while maintaining excellent adhesion. In addition, the low refractive-index layer 40 may have an index of refraction of about 1.2 to about 1.5. Within this range, the low refractive-index layer can provide improved optical properties to the anti-reflective film due to a large difference in index of refraction between the high refractive-index layer and the low refractive-index layer.

As used herein, reflection means a phenomenon that, when light traveling through a certain medium reaches an interface with other medium, all or part of the light is sent back into the original medium. When light reflection occurs, transmitted light intensity decreases as much as reflected light intensity, which can cause unstable luminous output. An anti-reflective film may refer to a film for preventing such reflection.

Thus, an anti-reflective film is required to ensure predefined optical properties. For example, an anti-reflective film needs to have low reflectance and must not cause any variation on a colorimeter during light transmission. The anti-reflective film 100 as set forth above is sequentially formed, for example, above a PET film, with the high refractive-index layer having an index of refraction of about 1.62 to about 1.70 and a thickness of about 200 nm to about 450 nm and the low refractive-index layer having an index of refraction of about 1.22 to about 1.25 and a thickness of about 90 nm to about 130 nm, thereby exhibiting optimized reflectance and optical properties.

The anti-reflective film may have a pencil hardness of about B to about H. As used herein, the pencil hardness refers to a degree of scratching upon drawing a line on the film five times using a pencil at 45° under constant load. Here, a hardness value of the film is designated by H, F, HB, B, or the like. A higher level of H indicates higher hardness (i.e. the film is harder) and a higher level of B indicates lower hardness (i.e. the film is softer).

As described above, the anti-reflective film includes the hard coating layer, in addition to the high refractive-index layer and the low refractive-index layer, thereby ensuring desired strength. As such, within the pencil hardness range as set forth above, the anti-reflective film can exhibit a hardness of H or higher when the film is used as an anti-reflective film for touchscreen panels.

The anti-reflective film may have a water contact angle of about 70° or less. When water is placed on a horizontal surface of a solid material, a water droplet retaining a lens shape can be formed. Here, the water droplet has a curved surface, which forms an angle with the surface of the solid material. When a value of the angle is measured at an inner side of the water droplet, the value is referred to as a contact angle. Specifically, as used herein, the contact angle refers to an angle formed between the anti-reflective film and the surface of water.

An anti-reflective film having a water contact angle of about 70° or less has an advantage in terms of high surface adhesion. Although the water contact angle of the anti-reflective film does not have a lower limit, the anti-reflective film may specifically have a water contact angle of about 40° to about 70°.

The anti-reflective film may have a reflectance of less than about 0.5%, as measured at a wavelength of about 380 nm to about 780 nm. As used herein, the reflectance refers to a percentage of reflective light energy to incident light energy. Thus, the reflected energy decreases with decreasing reflectance of the anti-reflective film, thereby reducing negative effects caused by light reflection. Accordingly, when reflectance of the anti-reflective film is maintained at less than about 0.5%, the anti-reflective film can exhibit sufficient anti-reflection function and can prevent reflected light from having a blue or red tone by virtue of low reflectance thereof. In addition, there is an advantage in that reflected light has a flat reflectance spectrum and a neutral color value.

Specifically, the anti-reflective film may have a reflectance of less than about 0.3%, as measured at a wavelength of about 450 nm to about 650 nm. This wavelength range of about 450 nm to about 650 nm is within the visible range of about 380 nm to about 780 nm, and the anti-reflective film can have desired optical properties, i.e. a reflectance of less than about 0.3% through optical design intended to adjust the index of refraction and thickness of the high refractive-index layer, the index of refraction and thickness of the low refractive-index layer, and the index of refraction and thickness of the hard coating layer to the range set forth above.

The anti-reflective film may have a color value $a^*$ of $-1<a^*<2$ and a color value $b^*$ of $-1<b^*<1$ for reflected light upon irradiation with white light. When the anti-reflective film is irradiated with white light in accordance with a CIE standard colorimetric system established by the Commission International de L'eclairage (CIE, International Commission on Illumination), the color value of reflected light may be represented by CIE $L^*$, $a^*$, and $b^*$ which are defined such that a distance between two colors in a color space corresponds to a difference in color observed with the naked eye, based on a CIE 10° standard observer (CIE 1964). Here, $L^*$, $a^*$, and $b^*$ represent brightness, a value between red and green, and a value between yellow and blue, respectively. Thus, the color values upon irradiation of the anti-reflective film with white light (D65) at a wavelength of about 380 nm to about 780 nm may be represented by $a^*$ and $b^*$ values, respectively.

It can be said that a lower absolute value of the color value indicates a smaller change in color difference caused by light. Here, the color difference refers to a perceptual difference between two colors and may be measured in terms of both reflective color difference and transmissive color difference using a colorimeter.

The anti-reflective film has a laminate structure of the transparent substrate, the hard coating layer, the high refractive-index layer, and the low refractive-index layer and is designed by adjustment of the thickness and index of refraction of the respective layers, whereby the absolute value of the color value for reflected light can be maintained in a predetermined range. Within the ranges of the color value $a^*$ and the color value $b^*$ as set forth above, the anti-reflective film does not appear blue or red, and can exhibit a neutral color.

Specifically, the indexes of refraction of the hard coating layer, the high refractive-index layer, and the low refractive-index layer are identified using a prism coupler and a PET film is provided as the substrate, followed by simulating the respective layers using an optical design tool, whereby the structure, thickness, and the like of each layer constituting the anti-reflective film, can be inferred, assuming that the anti-reflective film exhibits a reflectance of less than about 0.3% and has color values for reflected light satisfying −1<a*<2 and −1<b*<1.

Accordingly, when a PET film is sequentially coated with a hard coating layer having a thickness of about 50 nm to about 200 nm, a high refractive-index layer having a thickness of about 200 nm to about 450 nm, and a low refractive-index layer having a thickness of about 50 nm to about 150 nm through such a simulation, it is possible to design an anti-reflective film exhibiting a reflectance of less than about 0.3% and having color values for reflected light satisfying −1<a*<2 and −1<b*<1.

Hereinafter, the present invention will be described in more detail with reference to some examples. It should be understood that these examples are provided for illustration only and are not to be construed in any way as limiting the present invention.

EXAMPLE AND COMPARATIVE EXAMPLE

Example

1. Preparation of Anti-Reflective Coating Composition for Low Refractive-Index Layer 100 parts by weight of water, 433 parts by weight of isopropanol, and 36 parts by weight of 0.1 M $HNO_3$ were placed in a reactor, followed by stirring for 10 minutes. Next, 372 parts by weight of tetraethoxysilane (tetraethyl orthosilicate, TEOS) and 29 parts by weight of (3,3,3-trifluoropropyl)triethoxysilane were slowly introduced into the reactor through a funnel for 30 minutes. Next, the components were stirred at 50° C. for 2 hours, followed by cooling to room temperature, and then stirred again at 200 rpm for 24 hours, thereby obtaining a transparent binder solution. It was confirmed that the solution had a solid content of 13 wt % and a pH of 2.2. The transparent solution was used in manufacture of a coating composition in the following stage without a separate purification process.

65 parts by weight of the prepared binder solution, 100 parts by weight of isopropanol, and 65 parts by weight of a hollow silica particle-isopropanol dispersion sol (Thrylya 4110, JGC C&C Co., Ltd., 20% w/w) having a number average diameter of 60 nm were placed in a reactor, followed by stirring at room temperature for 24 hours, thereby preparing an anti-reflective coating composition for a low refractive-index layer. It was confirmed that the prepared anti-reflective coating composition for a low refractive-index layer had a solid content of 10 wt % and a pH of 2.5.

2. Preparation of Anti-Reflective Coating Composition for Hard Coating Layer

Based on 100 parts by weight of solids, 15 parts by weight of inorganic nanoparticles (XBA-ST, Nissan Chemical Ind.), 35 parts by weight of a UV-curable acrylate resin (Kyoeisha), and 7 parts by weight of a photo-initiator (Irgacure-184, Ciba Specialty Chemicals) were mixed, followed by diluting with a diluting solvent methylethylketone (MEK), thereby preparing an anti-reflective coating composition for a hard coating layer. It was confirmed that the prepared anti-reflective coating composition for a hard coating layer had a solid content of 45 wt %.

3. Preparation of Anti-Reflective Film

The prepared anti-reflective coating composition for a hard coating layer was coated onto a 125 μm thick PET film to a thickness of 90 nm using a Mayer bar, followed by curing through UV irradiation at 300 mJ using an 180 W high voltage mercury lamp, thereby forming a hard coating layer.

A high refractive-index layer having a thickness of 200 nm and an index of refraction of 1.62 was formed on the hard coating layer, and then the prepared anti-reflective coating composition for a low refractive-index layer was coated onto the high refractive-index layer to a thickness of 105 nm using a Mayer bar, followed by drying at 130° C. for 2 minutes, thereby forming a low refractive-index layer. Next, the resulting laminate structure was subjected to aging in an oven at 60° C. for 24 hours, thereby preparing a final anti-reflective film.

Comparative Example

A final anti-reflective film was prepared in the same manner as in Example except that a hard coating layer was not formed on a PET film.

TABLE 1

| Configuration | | Example | Comparative Example |
|---|---|---|---|
| Low refractive-index layer | Index of refraction | 1.23 | 1.23 |
| | Thickness (nm) | 105 | 105 |
| High refractive-index layer | Index of refraction | 1.64 | 1.64 |
| | Thickness (nm) | 200 | 200 |
| Hard coating layer | Index of refraction | 1.52 | — |
| | Thickness (nm) | 90 | — |
| PET | Index of refraction | 1.66 | 1.66 |
| | Thickness (μm) | 125 | 125 |

Experimental Example

Optical Properties of Anti-Reflective Film

For each of the anti-reflective films prepared in Example and Comparative Example, transmittance was measured using a CM-5 spectrophotometer (Konica Minolta Co., Ltd.). In addition, a back surface of each of the anti-reflective films was subjected to blackening treatment, followed by measurement of luminous reflectance. Moreover, CIE L*, a*, and b* values, specifically, transmissive a*, transmissive b*, reflective a*, and reflective b* values according to the structure of each of the anti-reflective films in Example and Comparative Example were measured under the following conditions: white light (D65) and a CIE 1964 observer. In addition, pencil hardness of each of the anti-reflective films was measured in accordance with JIS K 5600-5-4. Results are shown in Table 2.

TABLE 2

| | Example | Comparative Example |
|---|---|---|
| Transmittance (%) | 99.64 | 98.93 |
| Reflectance (%) | 0.205 | 0.493 |
| Pencil hardness | H | 2B |
| Transmissive a* | −0.28 | −0.03 |
| Transmissive b* | 0.34 | 0.18 |
| Reflective a* | 1.99 | −0.05 |
| Reflective b* | −0.10 | 1.02 |

As shown in Table 2, it was ascertained that the anti-reflective film including the hard coating layer had higher pencil hardness than the anti-reflective film not including the hard coating layer. Thus, it can be seen that the hard coating layer contributes to enhancement in strength of an anti-reflective film.

Figure 2:
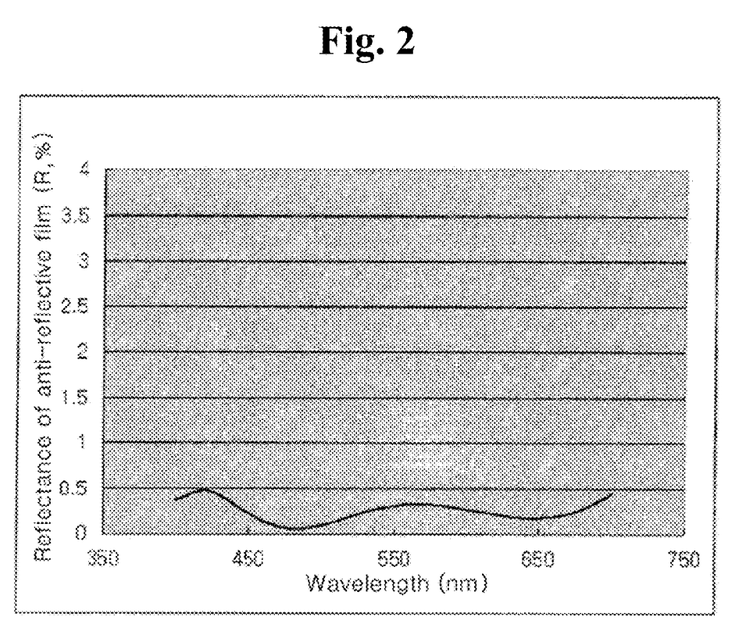
FIG. 2 is a graph showing reflectance as a function of wavelength for an anti-reflective film in Example.
Figure 3:
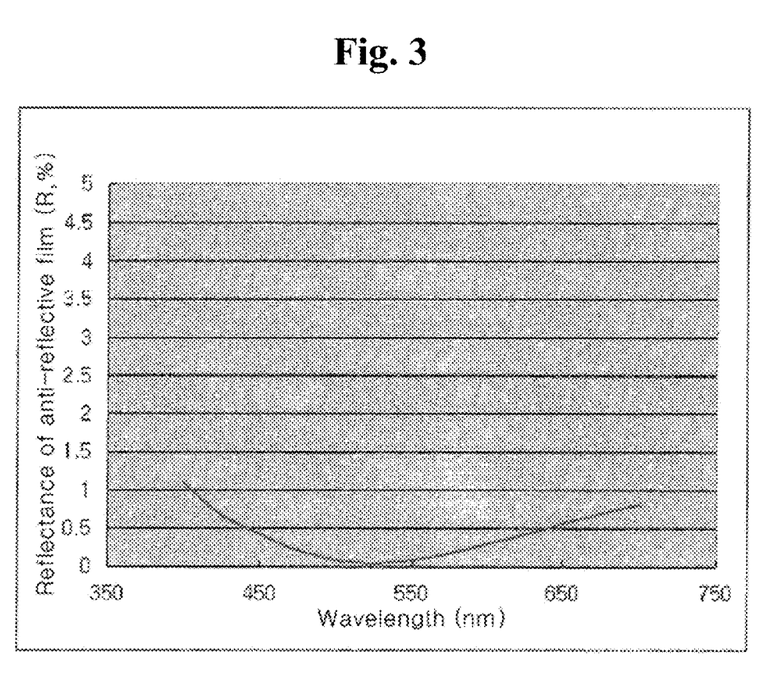
FIG. 3 is a graph showing reflectance as a function of wavelength for an anti-reflective film in Comparative Example.

FIG. 2 is a graph showing reflectance as a function of wavelength for the anti-reflective film prepared in Example, and FIG. 3 is a graph showing reflectance as a function of wavelength for the anti-reflective film prepared in Comparative Example. Referring to FIGS. 2 and 3, it was ascertained that, although the anti-reflective film of Comparative Example had a reflectance of 0.5% or less as measured at a wavelength of about 450 nm to about 650 nm, the anti-reflective film of Example had a relatively stable reflectance of 0.3% or less, as compared with that of Comparative Example.

In addition, the anti-reflective film of Example had a color value a* of −1 to 2 and a color value b* of −1 to 1 for reflected light. Thus, it could be seen that the anti-reflective film of Example had insignificant color difference caused by reflected light, thereby exhibiting better anti-reflection properties than Comparative Example.

The invention claimed is:

1. An anti-reflective film having a laminate structure of a transparent substrate, a hard coating layer, a high refractive-index layer, and a low refractive-index layer,
   wherein the hard coating layer has a thickness of 50 nm to 200 nm,
   wherein the low refractive-index layer comprises:
      a binder prepared by polymerization of a silane compound represented by Formula 1 with an organosilane compound represented by Formula 2; and
      hollow silica particles,
      wherein the organosilane compound represented by Formula 2 is present in an amount of 0.1 parts by weight to about 7.8 parts by weight based on 100 parts by weight of the silane compound represented by Formula 1, and wherein the low refractive-index layer has an index of refraction of 1.2 to 1.25, and
   wherein the anti-reflective film has a color value a* of −1<a*<0.28 and a color value b* of 0.34<b*<1 for reflected light upon irradiation with white light,

[Formula 1]

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying 0≤x<4;

[Formula 2]

where $R^3$ is a $C_1$ to $C_{12}$ fluoroalkyl group; $R^4$ is a $C_1$ to $C_6$ alkyl group; and y is an integer satisfying 0≤y<4.

2. The anti-reflective film according to claim 1, wherein the silane compound represented by Formula 1 comprises at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof.

3. The anti-reflective film according to claim 1, wherein the organosilane compound represented by Formula 2 comprises at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof.

4. The anti-reflective film according to claim 1, wherein the hollow silica particles have a number average diameter of 1 nm to 1,000 nm.

5. The anti-reflective film according to claim 1, wherein the binder is present in an amount of 10 parts by weight to 120 parts by weight based on 100 parts by weight of the hollow silica particles.

6. The anti-reflective film according to claim 1, wherein the hard coating layer has an index of refraction of 1.5 to 1.6.

7. The anti-reflective film according to claim 1, wherein the hard coating layer comprises inorganic nanoparticles, a UV-curable resin, a curing initiator, and a solvent.

8. The anti-reflective film according to claim 1, wherein the high refractive-index layer has an index of refraction of 1.6 to 1.7.

9. The anti-reflective film according to claim 1, wherein the anti-reflective film has a pencil hardness of B to H.

10. The anti-reflective film according to claim 1, wherein the anti-reflective film has a water contact angle of about 70° or less.

11. The anti-reflective film according to claim 1, wherein the anti-reflective film has a reflectance of less than 0.5% as measured at a wavelength of 380 nm to 780 nm.

* * * * *